United States Patent

[11] 3,555,281

[72] Inventors Alexei Petrovich Skibarko
Ulitsa Danfilova, 4/5, kv. III, Moscow, and
Karen Andranikovich Gulgazaryan,
Ulitsa kirova, 3, kv. 6, Erevan, U.S.S.R.

[21] Appl. No. 704,674
[22] Filed Feb. 12, 1968
[45] Patented Jan. 12, 1971

[54] PHOTOTUBE WITH ELECTRODE DISPOSED ON OUTSIDE OF TUBE ENVELOPE FOR MODULATION PURPOSES
3 Claims, 2 Drawing Figs.

[52] U.S. Cl. ..... 250/211, 250/207
[51] Int. Cl. ..... H01j 39/14
[50] Field of Search ..... 250/207, 211, 213

[56] References Cited
UNITED STATES PATENTS
2,298,466 10/1942 Cooley ..... 250/211

*Primary Examiner*—Archie R. Borchelt
*Assistant Examiner*—Martin Abramson
*Attorney*—Waters, Roditi, Schwartz & Nissen

ABSTRACT: A photocell receiver is provided on the outer surface thereof in front of its light-sensitive surface with at least one electrode capable of transmitting luminous radiation, the electrode being positioned so that when supplied with an alternating voltage it produces an alternating electric field which penetrates through the light-sensitive surface to affect photoelectrons thereon.

Figure 1:
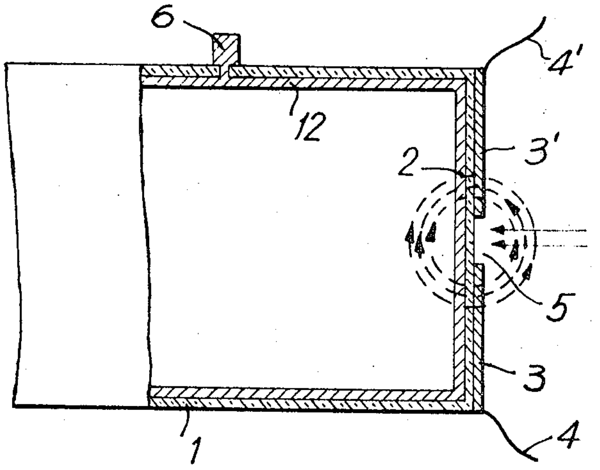

PHOTOTUBE WITH ELECTRODE DISPOSED ON OUTSIDE OF TUBE ENVELOPE FOR MODULATION PURPOSES

The present invention relates to receivers of luminous signals, in particular to photomultiplier cells, travelling-wave phototubes, and is applicable to heterodyne reception of luminous signals modulated by LF, HF and UHF, as well as to that of unmodulated luminous signals.

It is known to widely use photocell receivers, wherein heterodyning of the incoming signal is effected by way of modulating a photoelectron stream by applying the voltage of a local oscillator to the cathode and to one of the electrodes of the photomultiplier cell.

A disadvantage of such a photoemissive-cell receiver resides in the fact that it fails to provide heterodyning on the reasonably high frequencies, this being due to a considerable interelectrode transit time of electrons with respect to the oscillation period.

Another disadvantage of the aforementioned photoemissive-cell receiver lies in the fact that when heterodyning even on the frequencies which render it possible a high-power local oscillator is necessary.

It is an object of the present invention to provide a compact, power-saving and low-cost photoemissive-cell receiver convenient in service and allowing heterodyne reception within both high and low frequency bandwidths.

The above and other objects are achieved due to the fact that in the photoemissive-cell receiver of luminous signals disclosed in the present invention, provision is made for at least one electrode located outside of said receiver in front of the light-sensitive surface thereof, said electrode being transparent to luminous radiation and arranged so that when alternating voltage is supplied thereto, an alternating electric field which penetrates through said light-sensitive surface and affects the photoelectrons thus varying the density of the photocurrent.

It is preferred that when heterodyning the incoming signals modulated by ultrahigh frequency, the electrode be made as an UHF resonator provided with an aperture for passage of luminous radiation.

Moreover, it is preferable that in the photoemissive-cell receiver disclosed herein, two electrodes be arranged outside of the photocathode on the opposite sides of the lateral axis thereof, which electrodes when connected to the opposite poles of a source of alternating voltage are capable of producing an electric field which penetrates through the photocathode due to low conductivity of the material thereof.

Provision of the electrodes in front of the light-sensitive surface of the photoemissive-cell receiver ensures creation of an alternating electric field in close proximity to the surface of the photocathode, which electric field sharply decreases as the distance from the photocathode inside the cathode cell increases, as a result of which the time during which the alternating electric field affects the photoelectron is rather small as compared to the period of oscillations of the alternating electric field applied, whereby high-frequency modulation of electrons is rendered possible.

Provision of the electrode as a UHF resonator makes it possible to obtain a higher strength UHF field within the area, wherein the light-stimulated spot of the photosensitive surface is contained.

Figure 2:
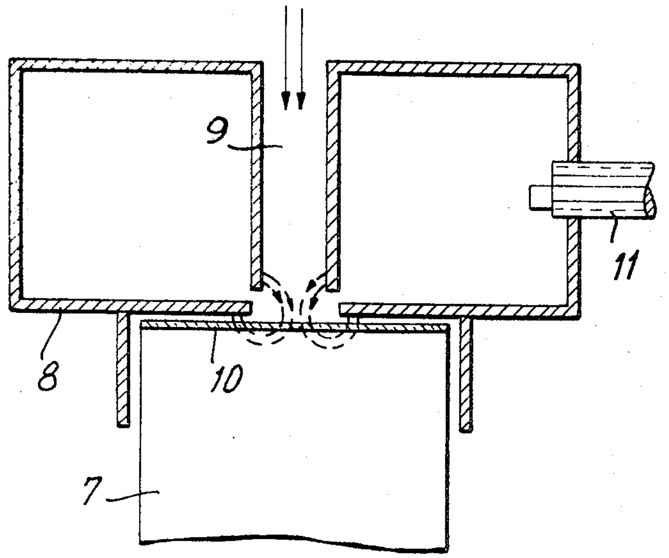

An embodiment of the present invention is described hereinbelow by way of example with reference to the accompanying drawings, wherein:

FIG. 1 illustrates a longitudinal section through a portion of the photomultiplier cell close to the photocathode with the electrodes arranged according to the invention; and FIG. 2 shows a longitudinal section through a portion of the photomultiplier cell close to the photocathode with the UHF resonator mounted according to the invention.

Now referring to FIG. 1, electrodes 3 and 3′ are fastened to a glass envelope 1 of the photomultiplier cell on the side of a photocathode 2 serving as the photosensitive surface thereof, to which electrodes an alternating voltage is applied from an alternator (not shown) via conductors 4 and 4′. An open clearance 5 between the electrodes 3 and 3′ is provided for luminous radiation to pass to the photocathodes. An alternative supply circuit may be likewise provided, wherein the electrodes 3 and 3′ are interconnected, the conductor 4′ disconnected from the electrode 3′, is connected to a cathode lead 6, whereas the conductor 4 remains connected to the alternator. FIG. 1 shows arrows indicating the direction of luminous radiation ($h\nu$) and dotted lines showing the electric power lines of the field inside and outside the photomultiplier cell, formed by the electrodes 3 and 3′ supplied with alternating voltage. When the electrodes 3 and 3′ are interconnected and the conductor 4′ is connected to the lead 6, the electric power lines will be closed on one side between the electrodes 3 and 3′ and the current-conductive surface 12 on the other side.

In the photomultiplier cell represented in FIG. 2, a UHF resonator 8 is made fast to a glass envelope 7 thereof, an aperture 9 therein serving for light rays to pass to a photocathode 10, whereas an input 11 is provided for exciting the resonator from a UHF alternator (not shown).

The photoemissive-cell receiver disclosed in the present invention functions as follows. A modulated light beam, upon passing through the open clearance 5 or aperture 9, strike upon the photocathode, thus causing a variable photoelectron stream. Concurrently, said stream is affected by a variable field produced by the electrodes 3 and 3′ or the UHF resonator 8. Thus, the modulation of the photoelectron stream is caused by two phenomena at one time, viz by the modulation of the incoming luminous signal and the modulation caused by the electric field produced by the electrodes 3 and 3′ or the UHF resonator 8. As a result the photelectron stream is modulated by a frequency equal to the differential frequency of the luminous signal modulation and the local oscillator. Moreover, said differential frequency may be varied within a considerable range by appropriately selecting the frequency of the local oscillator so as to attain a value in which it will then be well multiplied by the multiplying system of the photomultiplier cell.

Hence the invention makes it possible to employ conventional-type photomultiplier cells not transmitting ultrahigh frequencies, for receiving luminous signals modulated by such frequencies.

When receiving unmodulated luminous signals, the field produced by the electrodes 3 and 3′ or the UHF resonator 8, while affecting the photoelectrons stream, causes local modulation of the incoming signal.

Furthermore, the invention is likewise capable of affording local modulation of the incoming signal whenever it proves to be necessary with an extremely low-power local oscillator, this considerably reducing the weight, dimensions and power of the supply source of the entire photoemissive-cell receiver.

We claim:

1. A photocell receiver of luminous signals employed in heterodyne receiving apparatus, comprising a tube envelope, a photocathode disposed on the inside of said tube envelope, and at least one electrode disposed on the outside of said tube envelope for transmitting luminous radiation to said photocathode, said electrode being so positioned that when fed with an alternating voltage it produces an alternating electric field which penetrates through the photocathode and modulates the photoelectrons thereon.

2. A photocell receiver as claimed in claim 1 wherein said electrode is an ultrahigh-frequency resonator provided with an aperture for passage of luminous radiation.

3. A photocell receiver as claimed in claim 1 wherein the photocathode has a transverse axis, said electrodes being two in number and positioned in spaced relation on opposite sides of said transverse axis.